United States Patent

Kim

(10) Patent No.: US 9,582,708 B2
(45) Date of Patent: Feb. 28, 2017

(54) DISPLAY DEVICE AND METHOD OF CONTROLLING THE SAME

(71) Applicant: SAMSUNG ELECTRONICS CO., LTD., Suwon-si (KR)

(72) Inventor: Hyeon Kyeong Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 302 days.

(21) Appl. No.: 14/536,124

(22) Filed: Nov. 7, 2014

(65) Prior Publication Data

US 2015/0169939 A1 Jun. 18, 2015

(30) Foreign Application Priority Data

Dec. 12, 2013 (KR) .................. 10-2013-0154503

(51) Int. Cl.
G06K 9/00 (2006.01)
H04N 1/62 (2006.01)
G06K 9/46 (2006.01)

(52) U.S. Cl.
CPC ....... G06K 9/00234 (2013.01); G06K 9/4652 (2013.01); H04N 1/628 (2013.01)

(58) Field of Classification Search
USPC .................................................. 382/118, 167
See application file for complete search history.

(56) References Cited

U.S. PATENT DOCUMENTS

| 6,272,239 B1* | 8/2001 | Colla | G06T 7/408 348/E9.04 |
| 7,920,205 B2* | 4/2011 | Awazu | G03B 7/16 348/371 |
| 8,019,128 B2* | 9/2011 | Oosaki | G06K 9/00234 348/129 |
| 8,441,544 B2* | 5/2013 | Minagawa | H04N 5/232 348/222.1 |
| 8,520,091 B2* | 8/2013 | Fujiwara | H04N 5/23219 348/222.1 |
| 8,842,128 B2* | 9/2014 | Mosle | G06T 11/001 345/589 |

(Continued)

FOREIGN PATENT DOCUMENTS

| EP | 0514933 A2 | 11/1992 |
| JP | 2005-294917 A | 10/2005 |
| JP | 2009-260542 A | 11/2009 |

OTHER PUBLICATIONS

Communication issued on May 11, 2015 by the European Patent Office in related Application No. 14183237.8.

*Primary Examiner* — Ishrat I Sherali
(74) *Attorney, Agent, or Firm* — Sughrue Mion, PLLC

(57) ABSTRACT

A display device which accurately detects and corrects only a facial region contained in an image and thereby prevents an error in which a background or neighboring object having a similar color to a skin color is corrected together with the facial region, and a method of controlling the same are provided. The display device includes an image processor configured to detect a face candidate region from an input image, based on information associated with at least one face color region, to detect a face region by applying a face detection algorithm to the detected face candidate region and to perform skin color correction on the detected face region, and a display configured to display the corrected input content.

18 Claims, 11 Drawing Sheets

(56) References Cited

U.S. PATENT DOCUMENTS

| | | | |
|---|---|---|---|
| 8,890,973 B2* | 11/2014 | Shimizu | H04N 9/735 |
| | | | 348/223.1 |
| 9,245,330 B2* | 1/2016 | Aoki | H04N 1/62 |
| 2002/0048399 A1 | 4/2002 | Lee et al. | |
| 2003/0179911 A1 | 9/2003 | Ho et al. | |
| 2007/0274573 A1 | 11/2007 | Hori | |
| 2008/0212879 A1 | 9/2008 | Torii et al. | |
| 2010/0123802 A1 | 5/2010 | Kim | |
| 2010/0150435 A1 | 6/2010 | Yim | |
| 2013/0163862 A1* | 6/2013 | Huang | G06T 5/005 |
| | | | 382/164 |

* cited by examiner

FIG. 6

| REGION | TARGET COLOR |
|---|---|
| Skin | $(H_1, S_1)$ |
| Yellow | $(H_2, S_2)$ |
| Red | $(H_3, S_3)$ |
| Magenta | $(H_4, S_4)$ |
| Blue | $(H_5, S_5)$ |
| Cyan | $(H_6, S_6)$ |
| Green | $(H_7, S_7)$ |

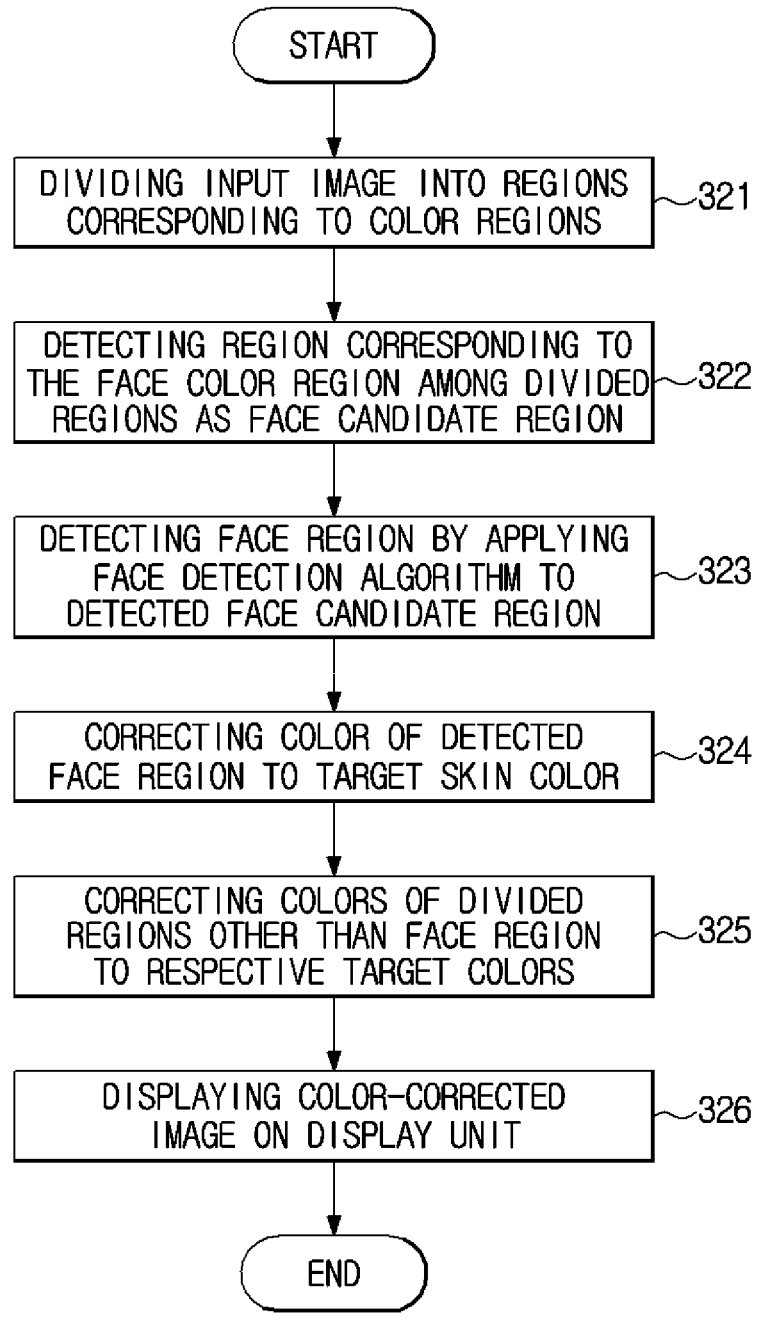

DISPLAY DEVICE AND METHOD OF CONTROLLING THE SAME

CROSS-REFERENCE TO RELATED APPLICATION

This application claims priority from Korean Patent Application No. 10-2013-0154503, filed on Dec. 12, 2013 in the Korean Intellectual Property Office, the disclosure of which is incorporated herein by reference in its entirety.

BACKGROUND

1. Field

Apparatuses and methods consistent with exemplary embodiments relate to a display device which corrects a skin color of the face contained in an image and displays the skin color, and a method of controlling the same.

2. Description of the Related Art

A display device processes and outputs image signals in a variety of forms and representative examples of the display devices include TVs, monitors, cellular phones, navigation systems and the like.

The face of a human contained in an image displayed on a display device is one of the first elements to catch the eye of viewers who view the display device. Accordingly, naturally correcting the face color of the human contained in the image without distortion is an essential function required for the display device.

SUMMARY

Therefore, it is an aspect of an exemplary embodiment to provide a display device to accurately detect and correct only a facial region contained in an image and thereby prevent an error in which a background or neighboring object having a similar color to a skin color is corrected together with the facial region, and a method of controlling the same.

Additional aspects of exemplary embodiments will be set forth in part in the description which follows and, in part, will be obvious from the description, or may be learned by practice of the exemplary embodiments.

In accordance with one aspect of the exemplary embodiments, a display device includes an image processor configured to detect a face candidate region from an input content, based on information associated with at least one face color region, configured to detect a face region by applying a face detection algorithm to the detected face candidate region and configured to perform skin color correction on the detected face region, and a display configured to display the corrected input content.

The face color region may include a skin color region, a yellow region and a red region.

The display device may further include a storage configured to store the information associated with the face color region.

The image processor may be configured to divide the input image according to a plurality of preset color regions and the color regions may include the skin color region.

The color regions may include a skin color region, a yellow region, a green region, a blue region, a cyan region, a magenta region and a red region.

The image processor may be configured to detect, as the face candidate region, a region of the input content corresponding to the face color region.

The image processor may be configured to perform the skin color correction by correcting a color of the detected face region to a target skin color.

The image processor may be configured to divide the input content into a plurality of regions corresponding to the color regions and detect, as the face candidate region, one of the divided regions corresponding to the face color region.

The image processor may be configured to correct colors of the divided regions other than the face region to respective preset target colors.

The face detection algorithm may include at least one from among knowledge-based methods, feature-based methods, template-matching methods and appearance-based methods.

The image processor may be configured to correct, when two or more of the color regions overlap each other, a color of a region of the input image, corresponding to the overlapping color region, to a target color having priority.

In accordance with one aspect of the exemplary embodiments, a method of controlling a display device includes detecting a face candidate region from input content, based on information associated with at least one face color region, detecting a face region by applying a face detection algorithm to the detected face candidate region, and performing skin color correction on the detected face region.

The face color region may include a skin color region, a yellow region and a red region.

The method may further include dividing the input content according to a plurality of color regions, wherein the color regions include the skin color region.

The color regions may include a skin color region, a yellow region, a green region, a blue region, a cyan region, a magenta region and a red region.

The detecting a face candidate region may include detecting, as the face candidate region, a region of the input content corresponding to the face color region.

The performing skin color correction may include correcting a color of the detected face region to a target skin color.

The detecting a face candidate region may include detecting, as the face candidate region, one of the divided regions, corresponding to the face color region.

The method may further include correcting colors of the divided regions other than the face region to respective preset target colors.

The method may further include correcting, when two or more of the color regions overlap each other, a color of a region of the input content, corresponding to the overlapping color region, to a target color having priority.

BRIEF DESCRIPTION OF THE DRAWINGS

These and/or other aspects of exemplary embodiments will become apparent and more readily appreciated from the following description of the embodiments, taken in conjunction with the accompanying drawings of which:

FIG. 6 illustrates an example of color correction in the display device according to an exemplary embodiment;

FIG. 11 is a flowchart illustrating color correction of a region other than a face region in the control method of the display device according to an exemplary embodiment.

DETAILED DESCRIPTION

Figure 1:
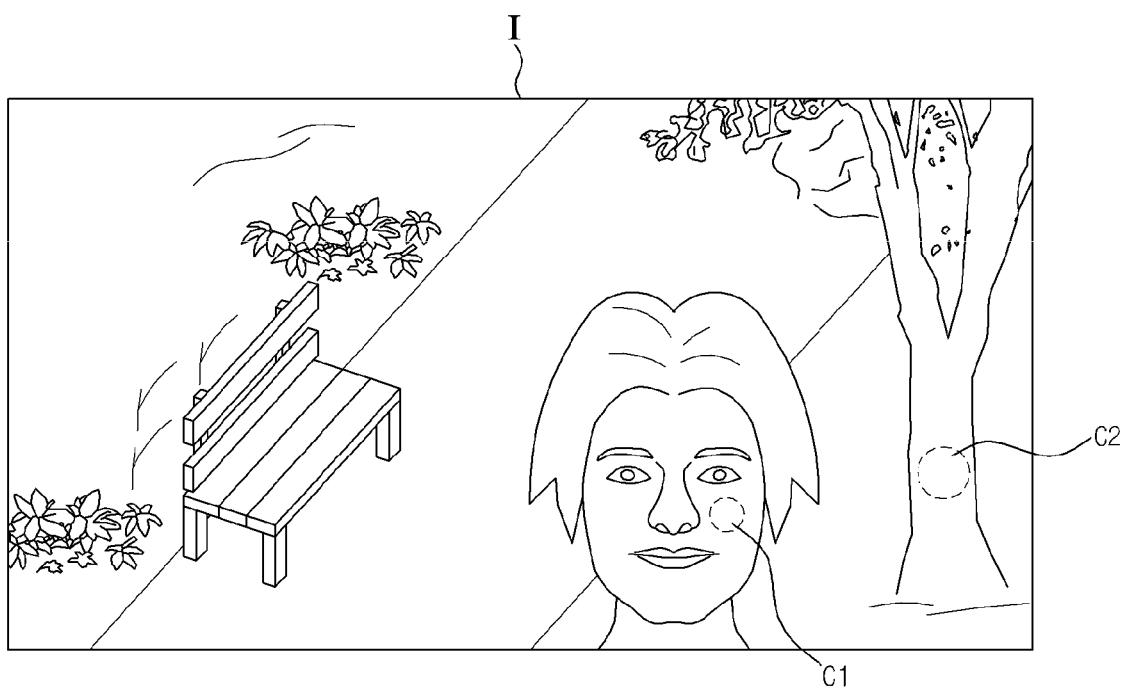
FIG. 1 illustrates an image including a human face.

Reference will now be made in detail to the embodiments, examples of which are illustrated in the accompanying drawings, wherein like reference numerals refer to like elements throughout.

Exemplary embodiments will be described in detail with reference to the annexed drawings.

FIG. 1 illustrates an image including a human face in the conventional art.

As shown in FIG. 1, an image I including a human face may be displayed on a display device. Generally, the display device extracts a region C1 having a skin color from the image I, corrects the extracted region C1 to a suitable target skin color and thereby corrects the skin color of the human present in the image I.

However, when one of the neighboring objects present in the image, having a color similar to the skin color, is present, a region C2 corresponding to the neighboring object may be also corrected to the target skin color together with the human face.

Differently, the display device according to the exemplary embodiment accurately extracts only the human face from the image, corrects the skin color of the extracted human face and thereby prevents regions other than the human face from being undesirably corrected to the skin color. Hereinafter, the display device according to an exemplary embodiment will be described in detail.

Figure 2:
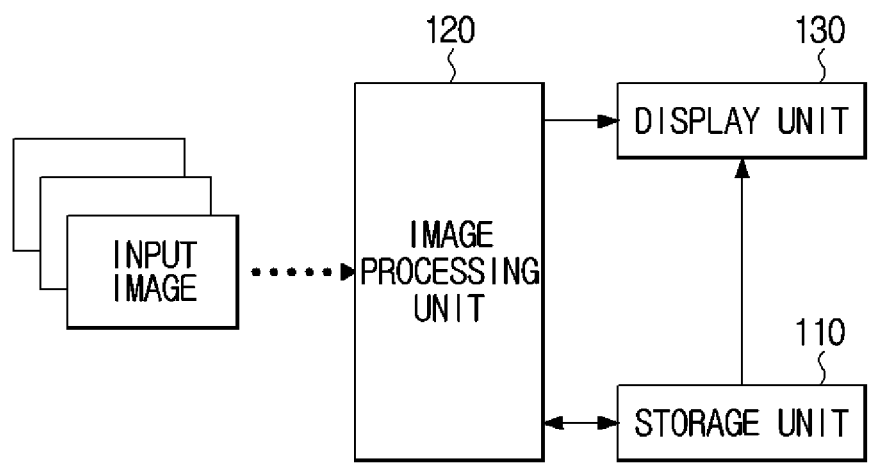
FIG. 2 is a block diagram illustrating a configuration of a display device according to an exemplary embodiment.

FIG. 2 is a block diagram illustrating a configuration of a display device according to an exemplary embodiment.

Referring to FIG. 2, the display device 100 according to the present exemplary embodiment includes a storage unit 110 ("storage") to store information associated with at least one face color region, an image processing unit 120 ("image processor") to detect a face region by applying a face detection algorithm to at least one face candidate region detected from an input image and correct a skin color of the detected face region, and a display unit 130 ("a display") to display the corrected image.

The information associated with the face color region may be preset by a designer and stored in the storage unit 110 and the face color region means a color region which may be considered a human face color in a color space. The information associated with the face color region may be represented by coordinates indicating a position in the color space.

The color of the face region of a human included in the image may be distorted by various factors such as brightness of imaging sites, clothing color of the human included in the image and neighboring objects of the human. Accordingly, the face color region may include color regions, for example a skin color region, and regions other than the skin color region, including a red region and a yellow region, other than the skin color region.

The storage unit 110 may include nonvolatile memories such as magnetic disks or semiconductor disks (solid state disks) and volatile memories such as dynamic random access memory (DRAM) and static random access memory (SRAM) to temporarily store data produced in the color correction process described later.

The image processing unit 120 detects the face candidate region from the input image, based on the information associated with the face color region and detects a face region by applying a face detection algorithm to the detected face candidate region. In addition, the image processing unit 120 corrects a skin color of the detected face region and elements constituting the image processing unit 120 and detailed operations of the elements will be described later.

The display unit 130 displays the color-corrected image and is implemented with a liquid crystal display (LCD), a light emitting diode (LED) or an organic light emitting diode (OLED).

Meanwhile, the image processing unit 120 suitably corrects the skin color of the input image and other colors thereof. For this purpose, the input image is divided according to a plurality of preset color regions and the preset color regions include the face color region and are stored in the storage unit 110. Hereinafter, an example of the preset color regions will be described in detail.

Figure 3:
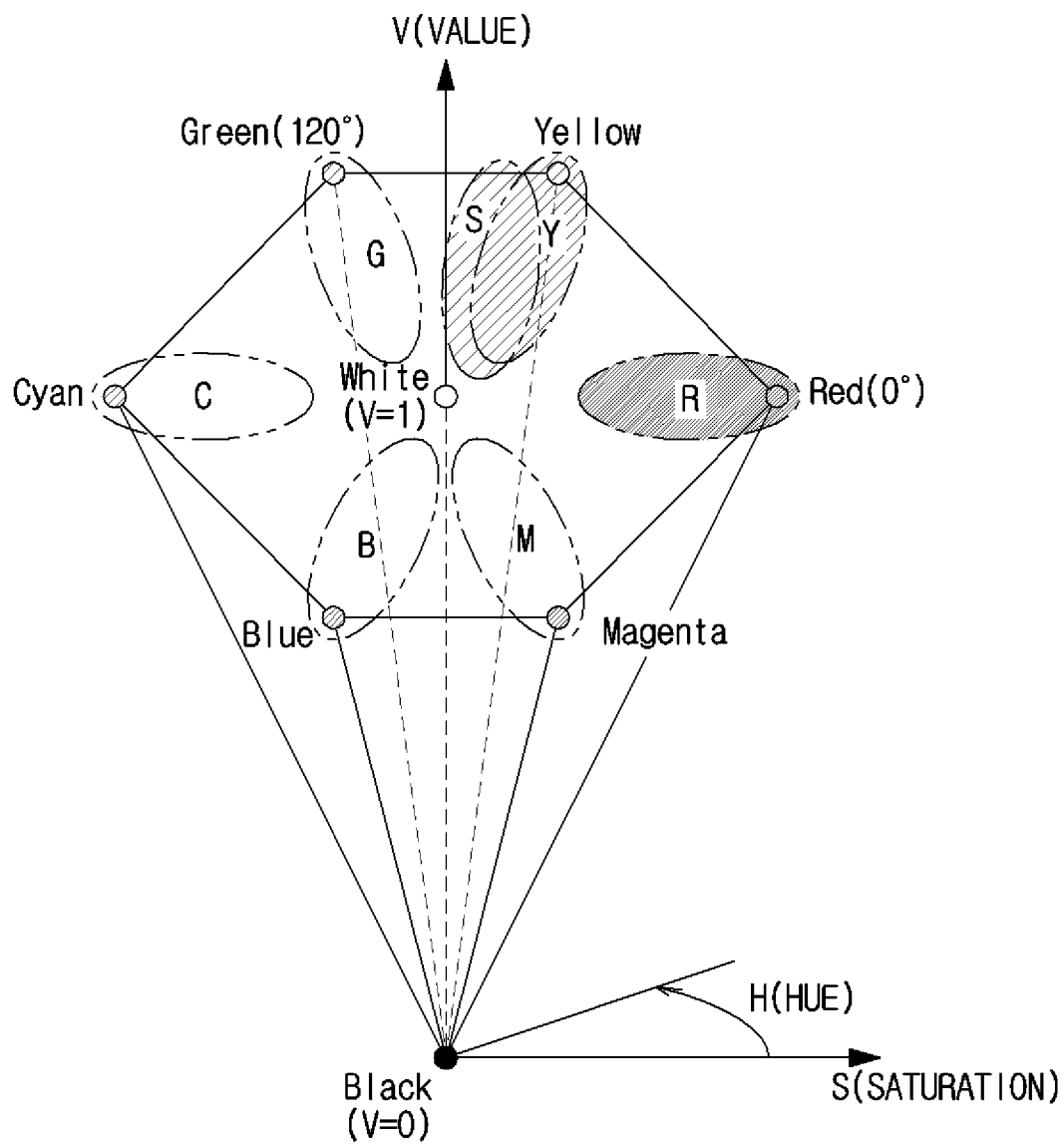
FIG. 3 illustrates an example of setting a color region in a HSV color space.
Figure 4:
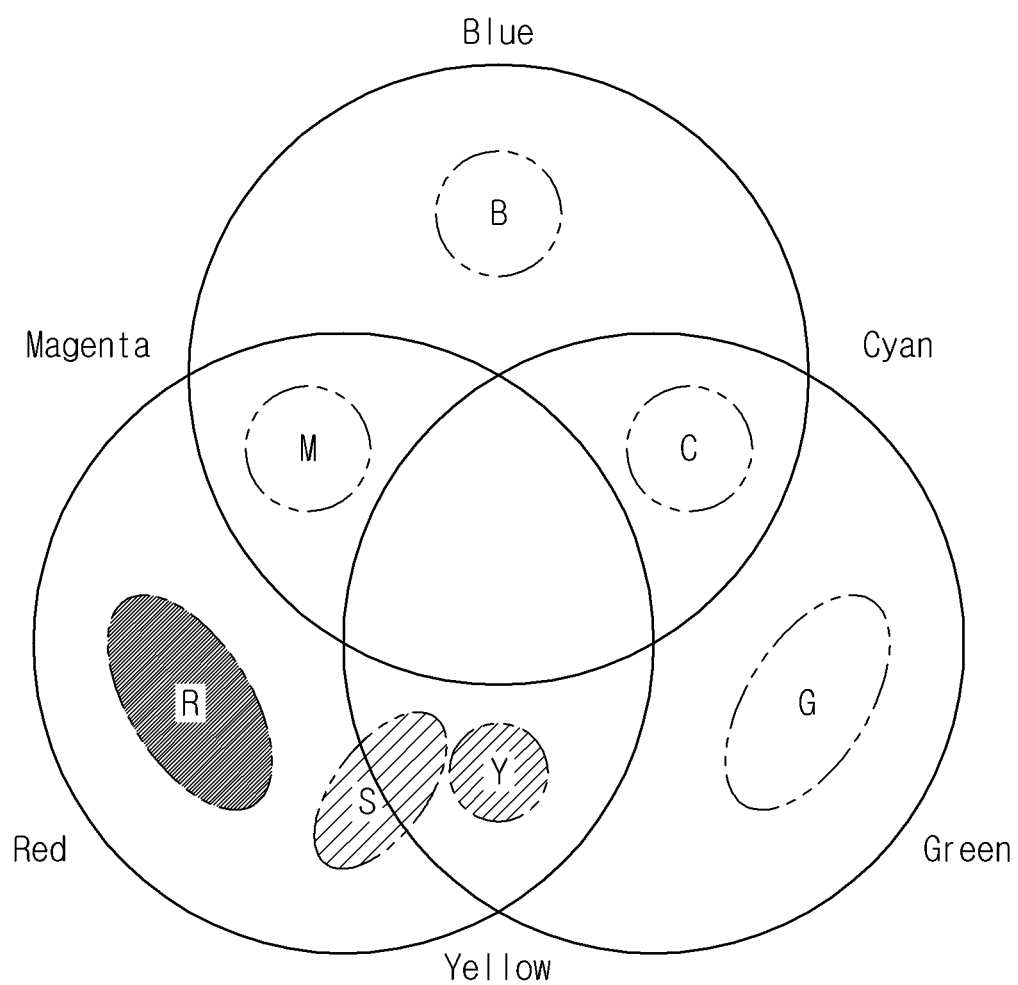
FIG. 4 illustrates an example of setting a color region in a RGB color space.

FIG. 3 illustrates an example of setting a color region in a HSV color space and FIG. 4 illustrates an example of setting a color region in RGB color space.

A variety of color spaces may be used to represent an input image by a color. For example, the color space may be one of a YUV (YCbCr) color space, a HSI color space, a HSV color space and a HSL color space, each of which separately has brightness information, and a CMY color space, CMYK color space and RGB color space, each of which has color information including brightness information.

Referring to FIG. 3, the HSV color space is a color model which represents a color using three elements, i.e., hue, saturation and value. The hue H is represented as an angle indicating a direction in which a certain color is located on a horizontal cross-section of a hexagonal pyramid. The saturation S is represented as a distance from the center of a hexagon and has an achromatic color in the exact center thereof. The value V is represented as a height of a hexagonal pyramid and becomes brighter as height increases. In the HSV color space, a color is represented by coordinates of H, S and V.

When the input image is represented by the HSV color space, as shown in FIG. 3, a plurality of color regions are preset in the HSV color space. For example, seven color regions including a skin color region (S), a yellow region (Y), a red region (R), a magenta region (M), a blue region (B), a cyan region (C) and a green region (G) may be preset. The skin color region (S), the yellow region (Y) and the red region (R) correspond to face color regions which may be considered as human face colors, as described above and the skin color region is set by information associated with a previously-learned skin color.

The yellow region (Y) includes a certain location actually indicating yellow in the HSV color space and locations indicating colors which may be recognized as yellow by the naked eye of the viewer.

Similarly, the red region (R) includes a certain location actually indicating red in the HSV color space and locations indicating colors which may be recognized as red by the naked eye of the viewer. The magenta region (M) includes a certain location actually indicating magenta in the HSV color space and locations indicating colors which may be recognized as magenta by the naked eye of the viewer. The same description will be applied to other color regions as well.

Referring to FIG. 4, the RGB color space is a color model which produces a desired color by suitably mixing three primary colors, i.e., red, green and blue, of light. The RGB color space may be represented by hexagonal coordinate systems including three axes respectively indicating a red channel, a green channel and a blue channel, and may express a single color by representing a mix level between red, green and blue by coordinates.

When the input image is represented by a RGB color space, as shown in FIG. 4, a plurality of color regions may be preset in the RGB color space. For example, seven color regions including a skin color region (S), a yellow region (Y), a red region (R), a magenta region (M), a blue region (B), a cyan region (C) and a green region (G) may be preset.

Colors of the skin color region (S), the yellow region (Y), the red region (R), the magenta region (M), the blue region (B), the cyan region (C) and the green region (G) are colors that are the most easily recognized by the naked eye of the viewer. Accordingly, the seven color regions may be preset in the example described above, but exemplary embodiments are not limited thereto. There is no limit as to the number of color regions and the position of respective color regions in the color space so long as the color regions include the skin color region (S), the yellow region (Y) and the red region (R).

The following exemplary embodiment will be described based on the assumption that seven color regions are preset in the HSV color space in accordance with the example shown in FIG. 3.

Figure 5:
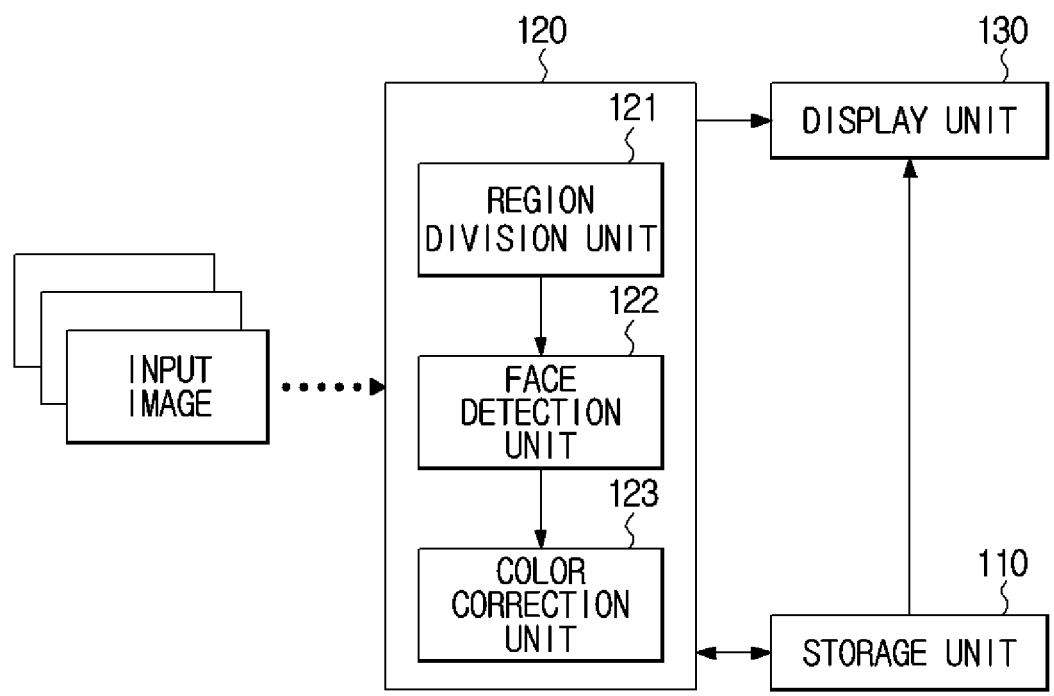
FIG. 5 is a block diagram illustrating a detailed configuration of the image processing unit of the display device according to an exemplary embodiment.

FIG. 5 is a block diagram illustrating a detailed configuration of the image processing unit of the display device according to an exemplary embodiment.

Referring to FIG. 5, the image processing unit 120 includes a region division unit 121 ("region divider") to divide the input image according to a plurality of preset color regions and to detect a face candidate region, a face detection unit 122 ("face detector") to detect a face region by applying a face detection algorithm to the detected face candidate region and a color correction unit 123 ("color corrector") to perform skin color correction of the detected face region.

The region division unit 121 may divide the input image according to the preset color regions and the input image may be a static image or a moving image. When the preset color regions are the same as in the example shown in FIG. 3, the region division unit 121 divides pixels constituting the input image according to seven color regions shown in FIG. 3.

Accordingly, a single input image is divided into a region corresponding to the skin color region (S), a region corresponding to the yellow region (Y), a region corresponding to the red region (R), a region corresponding to the magenta region (M), a region corresponding to the blue region (B), a region corresponding to the cyan region (C) and a region corresponding to the green region (G), and each corresponding region includes at least one pixel. The region corresponding to the skin color region (S) means a region having the color of the skin color region (S) in the input image and the region corresponding to the yellow region (Y) means a region having the color of the yellow region (Y) in the input image. The same description may be applied to other regions as well.

In addition, respective regions corresponding to the skin color region (S), the yellow region (Y) and the red region (R) included in the face color region may be detected as the face candidate regions of the input image.

The input image may include backgrounds or neighboring objects having a color similar to the face color and the region corresponding to the face color region is not necessarily a face region. Accordingly, the face detection unit 122 applies the face detection algorithm to the detected face candidate region and detects, as the face region, only a region recognized as the face in the face candidate region.

The face detection unit 122 may apply at least one of various face detection algorithms, for example, knowledge-based methods, feature-based methods, template-matching methods and appearance-based methods, to the face candidate region of the input image.

The knowledge-based method detects the face based on the knowledge of a researcher under an assumption that the human face includes face elements such as eyebrows, nose and mouth and the respective face elements have a predetermined distance and positional relationship therebetween, and generally utilizes a top-down approach. In accordance with the knowledge-based method, candidate regions are determined, based on the fact that four elements, i.e., left and right eyes, nose and mouth, of the face have high brightness and an average brightness of the respective candidate regions is extracted. In addition, an outline is detected by histogram equalization and the eye and mouth of data stored in a database are searched and matched, based on the detected outline information, thereby performing face detection. In accordance with the knowledge-based method, the face is detected from an image including the front face using a rule associated with the position and size of face elements.

The feature-based method detects the face using information including a size, shape and correlation of characteristic face elements and combinations thereof and generally utilizes a bottom-up approach.

The template-matching method detects the face by producing standard templates of all target faces and comparing the standard templates with the input image and includes a pre-defined template algorithm and a modified template algorithm. In accordance with the template-matching method, information is produced using a partial region or outline in prepared image data and the produced information is modified via each algorithm to increase an amount of similar information, which is then used for face detection.

In brief, the modified template algorithm calculates a symmetrical relation using brightness of the face region and produces templates using an average area brightness value. In addition, the face is matched using a point distribution model (PDM).

The appearance-based method detects the face according to a model learned by learning images set using pattern recognition and utilizes an eigenface produced by principal component analysis (PCA), linear discriminant analysis (LDA), neural network (NN), AdaBoost, a support vector machine (SVM) and the like.

The face detection algorithm described above may be only an example applied to an exemplary embodiment and the face detection algorithm that the face detection unit 122 may apply to the face candidate region of the input image is not limited to the example described above.

The color correction unit 123 performs skin color correction of the detected face region and, for this purpose, utilizes at least one of various skin color correction techniques. For example, the skin color correction may be formed using bilateral filtering, gaussian filtering or the like.

Meanwhile, the elements corrected by the color correction unit 123 may be changed according to color space. For example, in the case of using an HSV color space, at least one element of hue H, saturation S and value V may be corrected. In the case of using RGB color space, coordinates of each color channel may be corrected. In the case of using YCbCr color space, at least one of luminance (Y) and color difference (Cb,Cr) may be corrected.

In addition, the color correction unit 123 may perform color correction on regions of the input image, other than the face region. As described above, the region division unit 121 may divide the input image according to the preset color regions and perform suitable color correction on the divided regions other than the face region.

Meanwhile, the image processing unit 120 may include one or more processors and is for example implemented as a microprocessor, a central processing unit (CPU), a digital signal processor (DSP), an application-specific integrated circuit (ASIC) or a combination thereof.

All of the region division unit 121, the face detection unit 122 and the color correction unit 123 constituting the image processing unit 120 may be included in one processor and some thereof may be included in another processor. That is, an operation of the region division unit 121, the face detection unit 122 and the color correction unit 123 may be performed by one or more processors specifically or specially programmed to perform the functions of the region division unit 121, the face detection unit 122 and the color correction unit 123. In the present exemplary embodiment, there is no limit as to the type and number of the processors constituting the image processing unit 120 or performing an operation of the image processing unit 120.

Hereinafter, an example of color correction will be described with reference to FIG. 6.

FIG. 6 illustrates an example of color correction performed in the display device according to an exemplary embodiment.

The color correction unit 123 may correct a color of the input image to a preset target color and the preset target color may be stored in the storage unit 110.

For example, in the case of using HSV color space, as shown in FIG. 6, a target color of the skin color region is set to $(H_1,S_1)$, a target color of the yellow region is set to $(H_2,S_2)$, a target color of the red region is set to $(H_3,S_3)$, a target color of the magenta region is set to $(H_4,S_4)$, a target color of the blue region is set to $(H_5,S_5)$, a target color of the cyan region is set to $(H_6,S_6)$, and a target color of the green region is set to $(H_7,S_7)$. $H_m$ (in which m is an integer of 1 to 7) represents hue information among color information and $S_m$ (in which m is an integer of 1 to 7) represents saturation information.

$(H_1,S_1)$ may be included or not be included in the skin color region. In addition, $(H_2,S_2)$ may be included or not be included in the yellow region. The same description may be applied to others coordinates of $(H_3,S_3)$, $(H_4,S_4)$, $(H_5,S_5)$, $(H_6,S_6)$ and $(H_7,S7)$.

As in the example shown in FIG. 6, a color of the region corresponding the skin color region in the input image is corrected to a color of $(H_1,S_1)$, a color of the region corresponding to the yellow region is corrected to a color of $(H_2,S_2)$, a color of the region corresponding to the red region is corrected to a color of $(H_3,S_3)$, a color of the region corresponding to the magenta region is corrected to a color of $(H_4,S4)$, a color of the region corresponding to the blue region is corrected to a color of $(H_5,S_5)$, a color of the region corresponding to the cyan region is corrected to a color of $(H_6,S_6)$ magenta region and a color of the region corresponding to the green region is corrected to a color of $(H_7,S_7)$.

Only the hue and saturation are corrected in the example shown in FIG. 6, but the value may be also corrected to a desired preset target value.

Referring to FIG. 3 again, some of the preset color regions may overlap each other. In the example shown in FIG. 3, the skin color region (S) is set to partially overlap the yellow region (Y). In this case, a certain region of the input image may correspond to both the skin color region (S) and the yellow region (Y). Accordingly, priority between overlapping color regions may be set.

For example, in the case in which the skin color region (S) is set to have priority (e.g., have a higher priority), when a color of a certain region in the input image corresponds to a color of a region in which the skin color region (S) overlaps the yellow region (Y), the color correction unit 123 corrects the color of the region to a target color of the skin color region (S), that is, a color of $(H_1,S_1)$.

The color-corrected image may be displayed on the display unit 130 and may be stored in the storage unit 110.

Meanwhile, the color regions, target colors of the respective color regions and priority of overlapping color regions may be preset or changed by a designer.

Figure 7:
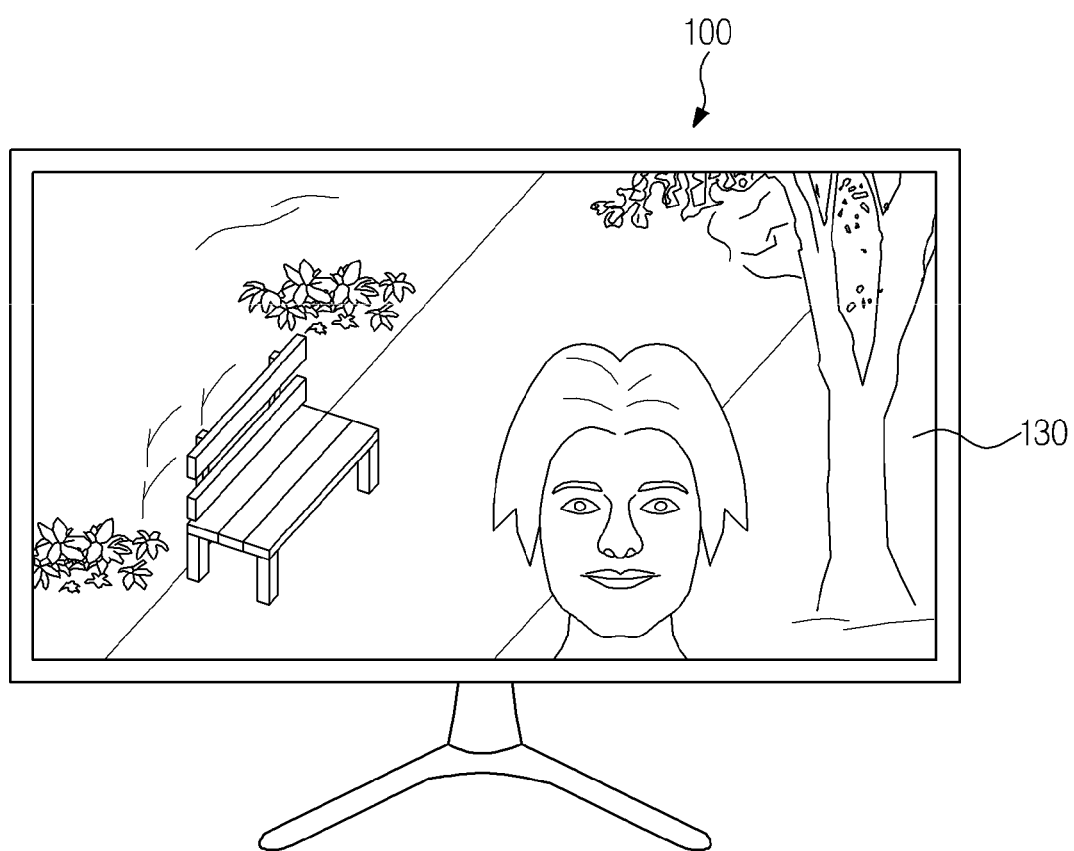
FIGS. 7 to 9 are views illustrating an outer appearance of the display device according to an exemplary embodiment.
Figure 8:
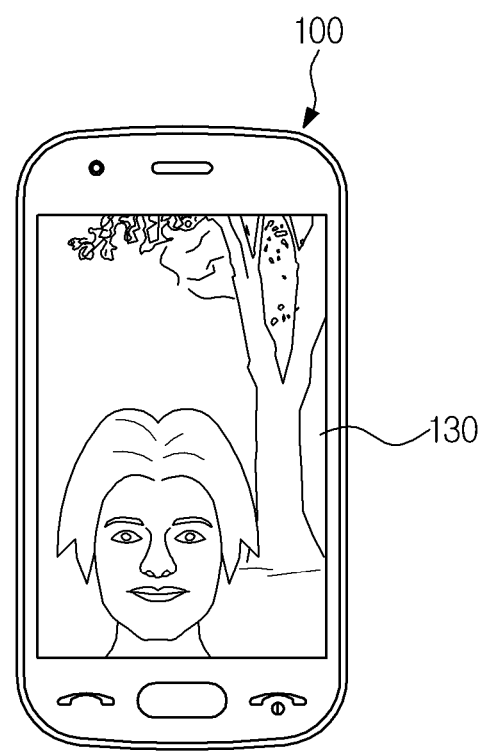
Figure 9:
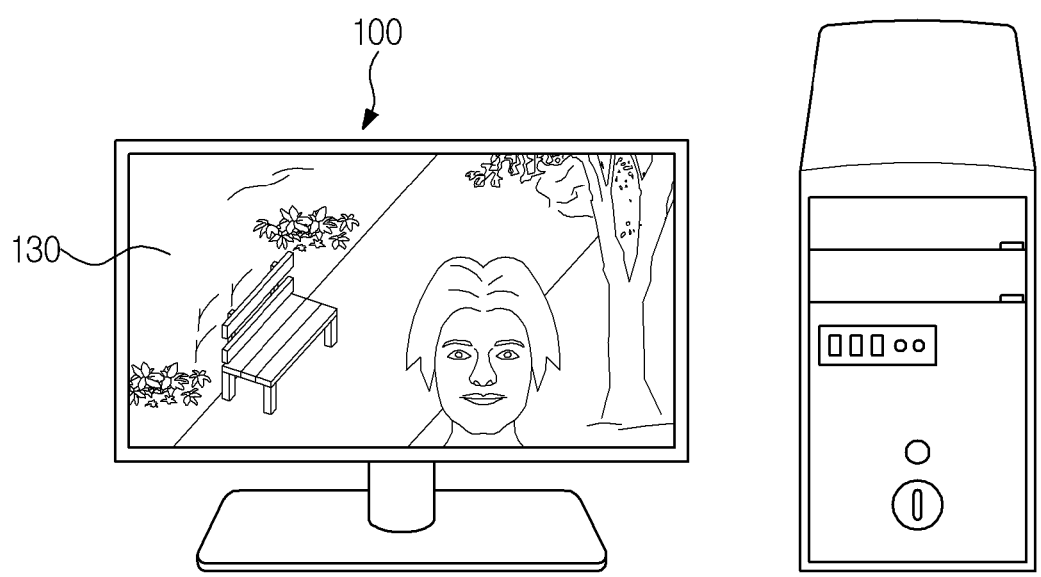

FIGS. 7 to 9 are views illustrating an outer appearance of the display device according to an exemplary embodiment.

The display device 100 according to the present exemplary embodiment may be implemented with an electronic device displaying a static image or a moving image and the type thereof is not limited. For example, the display device 100 is implemented with a TV, as shown in FIG. 7. The image processing unit 120 performs detection of the face candidate region, application of a face detection algorithm thereto and skin color correction in accordance with the afore-mentioned exemplary embodiment on an input image received from a broadcasting station and thereby suitably corrects the skin color of the face included in the input image. The image processing unit 120 may also perform color correction of regions other than the face region according to the preset target color.

In addition, in addition to color correction, the image processing unit 120 may further perform a variety of image processing operations required to display the received input image on the display unit 130 or for improvement in image quality. The image-processed final image is displayed on the display unit 130.

In addition, the display device 100 may be implemented as a cellular phone, as shown in FIG. 8. The image processing unit 120 performs detection of face candidate regions, application of a face detection algorithm thereto and skin color correction on an input image transmitted from the outside through a communication module, an input image obtained using a camera function provided in a cellular phone, an input image stored in a storage medium and the like and thereby suitably corrects the skin color of the face included in the input image. The image processing unit 120 may also perform color correction on regions other than the face region according to the preset target color. The color-corrected input image is displayed on the display unit 130.

In addition, the display device 100 may be implemented with a computer monitor, as shown in FIG. 9. The image processing unit 120 performs detection of face candidate regions, application of the face detection algorithm thereto and skin color correction in accordance with the afore-mentioned exemplary embodiment, on an input image transmitted from the outside through a communication module, an input image stored or recorded in a storage medium and the like. The image processing unit 120 may perform color correction on regions other than the face region according to the preset target color. The color-corrected input image may be displayed on the display unit 130.

Hereinafter, a method of controlling a display device according to an exemplary embodiment will be described.

Figure 10:
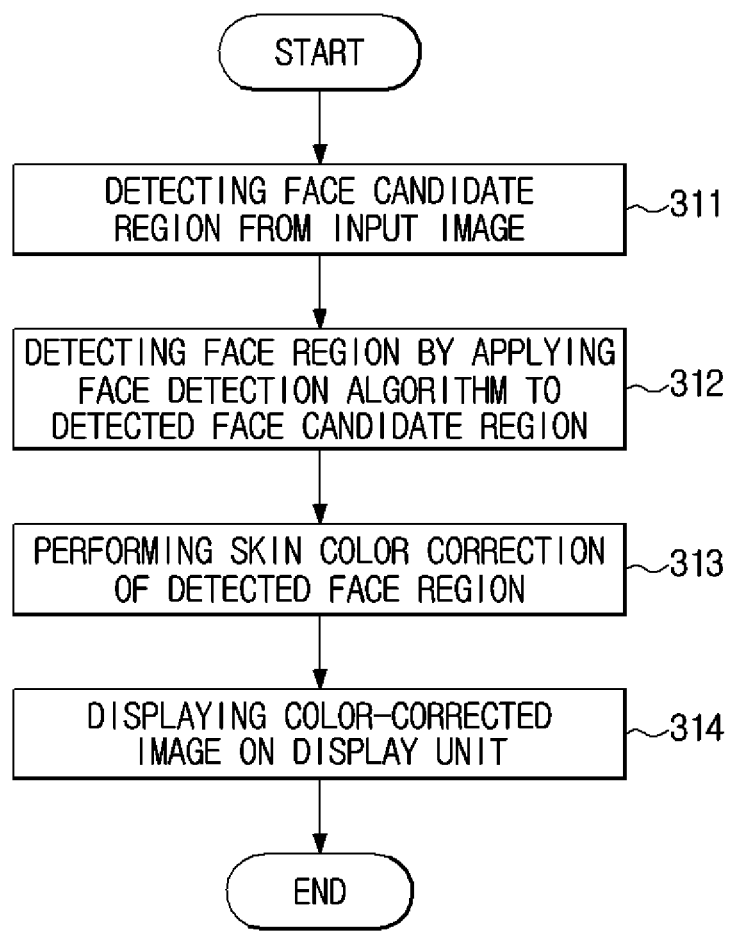
FIG. 10 is a flowchart illustrating a method of controlling a display device according to an exemplary embodiment.

FIG. 10 is a flowchart illustrating a method of controlling a display device according to an exemplary embodiment. The control method of the display device according to the present exemplary embodiment may be applied to the display device 100 of the exemplary embodiment described above, and FIGS. 2 to 9 and the description associated therewith may be applied to the control method of the display device according to the present exemplary embodiment.

Referring to FIG. 10, at least one face candidate region is detected from an input image (311). The detection of the face candidate region may be performed by the image processing unit 120 of the display device 100 and the image processing unit 120 may detect the face candidate region from the input image, based on information associated with at least one preset face color region. The information associated with the face color region may be stored in the storage unit 110. For example, the face color region may include a skin color region, a yellow region and a red region. In this case, the image processing unit 120 may detect a region corresponding to the skin color region, a region corresponding to the yellow region and a region corresponding to the red region in the input image as face candidate regions.

Face regions are detected by applying the face detection algorithm to the detected face candidate regions (312). The application of the face detection algorithm may also be performed by the image processing unit 120 and the image processing unit 120 may apply at least one of various face detection algorithms to the face candidate regions of the input image and may for example utilize at least one face detection algorithm of knowledge-based methods, feature-based methods, template-matching methods and appearance-based methods. The face detection algorithm is provided as only an example applicable to an exemplary embodiment and the face detection algorithm applicable to the face candidate region of the input image is not limited to the example described above.

Skin color correction is performed on the detected face region (313). The skin color correction may also be performed by the image processing unit 120 and the image processing unit 120 may perform skin color correction on the face region using at least one of various skin color correction techniques. Meanwhile, the element corrected by skin color correction may be changed according to the used color space. For example, in the case of using a color space, for example, a HSV color space, separately having color information and brightness information, skin color correction may include both color correction and brightness correction, or only one. The color correction may include hue (H) correction and saturation S correction.

In addition, the skin color-corrected input image is displayed on the display unit (314). The image displayed on the display unit 130 may be subjected to not only skin color correction but also various image processing operations for improvement of image quality.

FIG. 11 is a flowchart illustrating color correction of a region other than the face region in the control method of the display device according to an exemplary embodiment.

Referring to FIG. 11, an input image is divided into a plurality of regions corresponding to a plurality of preset color regions (321). The color regions may include a face color region and information associated therewith may be stored in the storage unit 110. An example of the color regions has been shown in FIGS. 3 and 4 above and a region corresponding to each color region means a region of the input image, having a color of the corresponding color region.

The region corresponding to the face color region among the divided regions is detected as a face candidate region (322). As described above, the region corresponding to the face color region means a region of the input image, having a color of the face color region.

A face region is detected by applying a face detection algorithm to the detected face candidate region (323) and an explanation associated therewith is the same as that of the operation (312) of FIG. 10.

The color of the detected face region is corrected to a preset target skin color (324) and colors of regions divided in the operation (321) other than the face region are corrected to respective target colors (325). The element corrected by color correction may be changed according to used color space. For example, in the case of using HSV color space, at least one element of hue H, saturation S and value V may be corrected. In the case of using RGB color space, coordinates of each color channel may be corrected. In the case of using YCbCr color space, at least one of luminance (Y) and color difference (Cb,Cr) may be corrected.

The color-corrected input image is displayed on the display unit (326). The image displayed on the display unit 130 may be subjected to not only skin color correction but also various image processing operations for improvement of image quality.

Meanwhile, some of the preset color regions may overlap each other. In the example shown in FIG. 3, the skin color region (S) is set to partially overlap the yellow region (Y). In this case, a certain region of the input image may correspond to both the skin color region (S) and the yellow region (Y). Accordingly, a priority between overlapping color regions may be set.

For example, in the case in which the skin color region (S) is set to have priority, when a color of a certain region in the input image corresponds to a region in which the skin color region (S) overlaps the yellow region (Y), the image processing unit 120 corrects a color of the overlapping region to a target color of the skin color region (S).

Meanwhile, the color regions, target colors of the respective color regions and priority of overlapping color regions may be preset or changed by a designer.

According to the display device and the method of controlling the same as described above, two operations including detecting at least one face candidate region based on at least one face color region and detecting a face region by applying a face detection algorithm to the detected face candidate region are performed for correction of a face color of a human included in an image, to prevent an error in which a background or neighboring object having a color similar to the skin color is subjected to skin color correction.

As is apparent from the above description, the display device and the method of controlling the same according to the exemplary embodiments enable accurate detection of only a face region included in an image and thereby prevent an error in which a background or neighboring object having a color similar to the skin color is subjected to skin color correction.

Although a few exemplary embodiments have been shown and described, it would be appreciated by those skilled in the art that changes may be made in these exemplary embodiments without departing from the principles and spirit of the invention, the scope of which is defined in the claims and their equivalents.

What is claimed is:

1. A display device comprising:
an image processor configured to divide input content into a plurality of preset color regions, and detect a face candidate region from the input content, based on information associated with at least one face color region, configured to detect a face region by applying a face detection algorithm to the detected face candidate region and configured to perform skin color correction on the detected face region; and
a display configured to display the corrected input content;
wherein the image processor is configured to correct, when two or more of the color regions overlap each other, a color of a region of the input content, corresponding to the overlapping color region, to a target color having priority.

2. The display device according to claim 1, wherein the face color region comprises a skin color region, a yellow region and a red region.

3. The display device according to claim 2, further comprising a storage configured to store the information associated with the face color region.

4. The display device according to claim 2, wherein the color regions comprise the skin color region.

5. The display device according to claim 4, wherein the color regions comprise the skin color region, the yellow region, a green region, a blue region, a cyan region, a magenta region and the red region.

6. The display device according to claim 1, wherein the image processor is configured to detect, as the face candidate region, a region of the input content corresponding to the face color region.

7. The display device according to claim 1, wherein the image processor is configured to perform the skin color correction by correcting a color of the detected face region to a target skin color.

8. The display device according to claim 4, wherein the image processor is configured to divide the input content into a plurality of regions corresponding to the color regions and detects, as the face candidate region, one of the divided regions corresponding to the face color region.

9. The display device according to claim 8, wherein the image processor is configured to correct colors of the divided regions other than the face region to respective target colors.

10. The display device according to claim 1, wherein the face detection algorithm comprises at least one from among knowledge-based methods, feature-based methods, template-matching methods and appearance-based methods.

11. A method of controlling a display device comprising:
dividing input content into a plurality of preset color regions;
detecting a face candidate region from the input content, based on information associated with at least one face color region;
detecting a face region by applying a face detection algorithm to the detected face candidate region;
performing skin color correction on the detected face region;
correcting, when two or more of the color regions overlap each other, a color of a region of the input content, corresponding to the overlapping color region, to a target color having priority.

12. The method according to claim 11, wherein the face color region comprises a skin color region, a yellow region and a red region.

13. The method according to claim 12, wherein the color regions comprise the skin color region.

14. The method according to claim 13, wherein the color regions comprise the skin color region, the yellow region, a green region, a blue region, a cyan region, a magenta region and the red region.

15. The method according to claim 11, wherein the detecting a face candidate region comprises detecting, as the face candidate region, a region of the input content corresponding to the face color region.

16. The method according to claim 11, wherein the performing skin color correction comprises correcting a color of the detected face region to a target skin color.

17. The method according to claim 13, wherein the detecting a face candidate region comprises detecting, as the face candidate region, one of the divided regions corresponding to the face color region.

18. The method according to claim 17, further comprising correcting colors of the divided regions other than the face region to respective target colors.

* * * * *